Patented Aug. 22, 1944

2,356,350

UNITED STATES PATENT OFFICE 2,356,350

VITAMINIZING FLUID

Fredus N. Peters, Evanston, and Eldor G. Rupp, Chicago, Ill., assignors to The Quaker Oats Company, Chicago, Ill., a corporation of New Jersey No Drawing. Application March 3, 1941, Serial No. 381,542

6 Claims. (Cl. 167—81)

The present invention relates to an aqueous vitamin-containing fluid, and more particularly to an improved aqueous vitaminizing liquid suitable for the fortification of various foodstuffs, especially those of the character of ready-to-eat cereals which are normally delivered to the ultimate consumer in the dry state.

The preferred aspect of the present invention concerns a process by which both water-insoluble and labile water-soluble vitamins may be simultaneously and successfully employed in the vitaminizing fluid. This aspect of the invention results from the discovery that certain materials as hereinafter described, when added to the vitaminizing fluid, stabilize not only the emulsion against "breaking," but also the labile vitamin component against deterioration with respect to its vitamin potency.

Another aspect of the invention is concerned with a fluid of the character described, in the form of an oil-in-water emulsion containing one or more water-insoluble vitamins dispersed in the aqueous vehicle. This aspect of the invention has for its objective the provision of an improved emulsifier for an oil-in-water type of vitaminizing fluid. Instead of depending solely upon the agency of those emulsifiers heretofore commonly employed in the preparation of an oil-in-water emulsion (such as polyglycerol derivatives, for example), we use in addition thereto certain materials to be enumerated later, which render the emulsion more stable.

A further aspect of the invention is concerned with an aqueous vitaminizing fluid containing only water-soluble vitamins, including at least one which is normally labile, i. e., one which is normally susceptible to deterioration, particularly when dissolved in an aqueous alkaline vehicle. This aspect of the invention has for its objective the provision of a new and improved buffering agent adapted to stabilize the labile component of the fluid against deterioration with respect to its vitamin potency.

Considering firstly that phase of the invention which relates to an oil-in-water type emulsion comprising a water-insoluble vitamin dispersed in an aqueous vehicle by means of any suitable emulsifying agent, the object is to provide an improved emulsifier for stabilizing such emulsions against "breaking." The improved emulsifier in accordance with this aspect of the present invention consists of any water-soluble proteinaceous material which is not coagulable by heat, the materials embraced within this generic class having been found to possess the hitherto unappreciated and unexpected property of stabilizing to an amazing degree the dispersion of a water-insoluble vitamin-containing oil in an aqueous vehicle.

The water-soluble, non-heat-coagulable proteinaceous materials embraced within this phase of the present invention include both the proteoses and the peptones, which constitute secondary protein derivatives. A wide variety of specific materials of the class described are available commercially at the present time, and merely for purposes of illustration, the following particular materials may be mentioned:

(A) Any of the well-known alcoholic fermentation residues which in general comprise the water-soluble, non-volatile material remaining after the removal of substantially all the volatile materials from a carbohydrate-containing mash which has undergone any of the well-known types of alcoholic fermentation, including (1) Ethylic fermentation. A material of this type is available on the market as so-called "distillers' slop."

(2) Butylic fermentation. A material of this character is available on the market under the trade name "B-Y Feed," which is sold by the Commercial Solvents Corporation. A refined type of butylic fermentation residue containing a high riboflavin concentration is also sold by the same company under the trade-name of "Riboflavin Concentrate." This latter material is described and claimed in Miner, United States Patent No. 2,202,161, as the fermentation residue of a vegetable carbohydrate-containing mash fermented by butyl alcohol producing bacteria.

(B) Peptones, for example, Bakers' bacteriological peptone such as that sold by the J. T. Baker Chemical Company.

(C) Concentrated steepwater, as is available from the manufacture of corn starch by the wet process.

(D) Concentrated water extract of corn, such as that sold under the trade name "Avenex Concentrate" by The Quaker Oats Company, this particular grade of material having been concentrated to approximately 70% solids.

A second phase of the invention is concerned with a vitamin-containing fluid comprising an aqueous solution of a normally labile water-soluble vitamin, stabilized against deterioration with respect to its vitamin potency by means of a new and improved buffer, the latter being present in an amount sufficient to maintain the hydrogen-ion concentration of the resulting solution at a pH below 7. The buffer employed in accordance with the second aspect of the invention consists of any of the well-known fermentation residues hereinbefore mentioned, which we have found to possess a peculiar buffering action on the labile water-soluble vitamin, in addition to the emulsifying characteristics possessed by the class of water-soluble, non-heat-coagulable proteinaceous materials as a whole.

As before mentioned, these fermentation residues comprise the water-soluble non-volatile materials remaining after the removal of substantially all the volatile material from a carbohydrate-containing mash which has undergone any of the well known types of alcoholic fermentation, including, for example, the ethylic fermentation or butylic fermentation, these two types being specifically mentioned for purposes of illustration only because of their outstanding commercial importance at the present time. The ethylic fermentation residues may take the form of the so-called "distillers' slop" obtainable from producers of ethyl alcohol by fermentation; and the butylic fermentation residues are readily available from manufacturers of butyl alcohol by fermentation under the well-known Weismann process. As pointed out in connection with the first aspect of the invention, the Commercial Solvents Corporation markets two butylic fermentation residues, one under the trade name of "B-Y Feed" and a refined type of residue of high riboflavin concentration under the trade name of "Riboflavin Concentrate." The riboflavin content of this latter product, which is asserted to have a potency of 4500 gamma of riboflavin per gram of concentrate, makes this material particularly attractive in the preparation of vitaminizing fluids for the fortification of foods designed for human consumption, because of the additional vitamin factor contributed thereby. Accordingly, "Riboflavin Concentrate" constitutes the preferred stabilizing-buffer of the present invention in all its aspects, although it may be mentioned in passing that the riboflavin content of this particular butylic residue does not in itself appear to be the factor responsible for the heretofore unappreciated properties of this material.

In effecting the stabilization of labile water-soluble vitamins in aqueous solution, any of the foregoing alcoholic fermentation residues (or a mixture thereof) is dissolved in the aqueous vehicle in an amount sufficient to buffer the resulting solution to a pH below 7, and preferably sufficient to buffer the solution to a pH in the neighborhood of 5.5. Where thiamin chloride constitutes the labile water-soluble vitamin to be stabilized it has been found advantageous to use water which is substantially free of reducing agents, including sulfites and nitrites, in preparing the solutions. The process may advantageously be carried out by slowly adding the fermentation residue to water and thereafter adding the normally labile water-soluble vitamin to the resulting solution. In other words, the results are frequently more satisfactory if the labile vitamin component is added to a solution of Riboflavin Concentrate than if the dry concentrate is added to a solution of the normally labile vitamin. By proceeding in this manner, the labile component is protected from the moment that it is dissolved in the aqueous vehicle.

When it is desired to supplement a foodstuff with both fat-soluble and labile water-soluble vitamins one may use to advantage any of the well-known alcoholic fermentation residues hereinbefore described. These materials, being members of the generic class of water-soluble, non-heat-coagulable proteinaceous materials, possess all the emulsifying properties exhibited by members of that class. However, in addition to the emulsifying powers common to that class, the alcoholic fermentation residues exhibit a characteristic buffering action not possessed by other members of that class, which fact serves to distinguish the fermentation residues as a distinct and separate sub-generic group within the generic class mentioned.

The preferred embodiment of the present invention accordingly represents one which interrelates both aspects: i. e., it comprises an oil-in-water type of emulsion which contains (1) A water-soluble labile vitamin in an aqueous vehicle;

(2) A water-insoluble vitamin dispersed in said vehicle, and (3) An emulsifying and buffering agent consisting of any of the hereinbefore mentioned alcoholic fermentation residues, these residues being present in an amount sufficient to maintain the hydrogen-ion concentration of the ultimate emulsion at a pH below 7, and preferably in the neighborhood of pH 5.5.

An emulsion of this character may be prepared by adding an alcoholic fermentation residue to a dispersion of a fat-soluble vitamin in an aqueous medium, and thereafter incorporating the water-soluble, normally labile vitamin in the resulting fluid. The preferred embodiment of the present invention, wherein the fortifying fluid contains both the labile water-soluble and the fat-soluble vitamins, may be produced by agitating a fat-soluble vitamin, either alone or dissolved in refined vegetable oil, with the water in the presence of any suitable supplementary emulsifying agent such as those well known in the art of preparing oil-in-water types of emulsions. This results in the formation of a crude emulsion which preferably should be homogenized by means of any suitable homogenizer. To this emulsion the fermentation residue is then slowly added in small quantities and with vigorous agitation, a sufficient quantity of the residue being added to buffer the resulting emulsion to a pH preferably in the neighborhood of 5.5. Thereafter, the water-soluble normally labile vitamin, preferably dissolved in a small amount of water, is mixed with the emulsion containing the fermentation residue. The preferred vitaminizing fluid prepared as described immediately above is stabilized not only as regards the susceptibility of the emulsion to "breaking," but also as regards the susceptibility of the normally labile vitamin component to deterioration in respect to its vitamin potency because of an adverse change in the pH of the solution.

In order more clearly to disclose the nature of the present invention, a preferred embodiment thereof will hereinafter be described. It should be clearly understood, however, that this is done solely by way of example, and is not to be construed as a limitation upon the spirit and scope of the appended claims.

*Example*

A vitaminizing fluid suitable for the fortification of puffed cereals in accordance with the process disclosed in the copending application of Fredus N. Peters, Serial No. 381,462, filed of even date herewith which issued July 20, 1943 as Patent No. 2,324,874, may be prepared in the following manner.

A vitamin D-containing oil is prepared by adding 30 parts by weight of a suitable supplementary emulsifying agent to 100 parts by weight of a solution of irradiated ergosterol in pure refined sesame oil. For this purpose any suitable emulsifying agent such as those commonly employed in the preparation of oil-in-water emulsions may be used, for example, sulfonated polyglycerol, lecithin, or a water extract of a cereal such as corn, concentrated to approximately 70% solids, such as that sold under the trade name "Avenex Concentrate."

The concentration of ergosterol in refined sesame oil may of course be adjusted within wide limits. However, we prefer to prepare a vitamin D-containing oil having 300,000 to 500,000 I. U. of vitamin D per gram, this potency being selected in order to keep the amount of oil added to the foodstuffs at a low figure.

720.5 grams of the above vitamin D oil is added with stirring to approximately 35 pounds of water. In order to obtain a high degree of dispersion, the resulting crude emulsion is preferably run through any suitable form of commercial homogenizer, for example, the "No. 50 Junior Viscolizer" sold by the Cherry-Burrell Corporation. When the emulsion is thoroughly homogenized it is placed in a stainless steel container equipped with a stirrer, and 5 pounds 15 ounces of commercial "Riboflavin Concentrate" having a claimed potency of 4500 gamma of riboflavin per gram is slowly added in small quantities, with vigorous stirring, to the emulsion. In order to avoid the formation of lumps, it is essential that the "Riboflavin Concentrate" be added gradually in small quantities.

78.2 grams of thiamin chloride is separately dissolved in one pint of water. This solution is then added to the emulsion of vitamin D containing the "Riboflavin Concentrate." The resulting composition is preferably passed through approximately a 160 mesh stainless steel screen into a stainless steel stock can. The strained emulsion may be diluted with any desired quantity of water to produce a satisfactory vitaminizing fluid adapted for the fortification of dry foodstuffs, such as ready-to-eat cereals, for example, puffed wheat, puffed rice, or the like, preferably in accordance with the process set forth in the copending Peters application mentioned above.

The specific factor present in alcoholic fermentation residues, which is responsible for the herein-disclosed emulsifying and buffering properties of this particular subclass of water-soluble, non-heat-coagulable proteinaceous materials, is not known at the present time. It was first thought that inasmuch as the fermentation residues appear to exert a buffering effect, perhaps a buffer might act as a stabilizer. This hypothesis, however, was shown to be false, by the preparation of a series of emulsions containing no fermentation residues but with the regular amount of sulfonated polyglycerol and buffered to pH values ranging from 3 to 8 in increments of 1, using citric acid-disodium phosphate buffers. It was found that in each case the resulting emulsion "broke" even more rapidly than did a plain, unbuffered oil-in-water emulsion. Accordingly, the buffering action of the fermentation residues does not appear to be alone responsible for the unexpected properties of this subclass.

It was further suggested that the proteinaceous components of the fermentation residues might be responsible for the stabilizing-buffering effects hereinbefore mentioned in connection with the second aspect of the invention. This hypothesis was likewise disproved, by incorporating various protein materials such as casein, egg albumen, soya protein and gelatine in a series of emulsions containing no fermentation residues. All these emulsions likewise "broke" even more rapidly than did a plain oil-in-water emulsion. It therefore appears that neither the buffering action nor the protein content of the fermentation residues alone is responsible for the stabilization of the emulsion. It must therefore be concluded that at the present time some unknown factor present in water-soluble, non-heat-coagulable proteinaceous materials is responsible for the characteristic property of the class in respect to the stabilization of emulsions. Regardless of the explanation, however, the results accomplished in accordance with the various aspects of the present invention are not only clearly unexpected and, indeed, inexplicable, but, moreover, are of great commercial importance, particularly in the fortification of foodstuffs of the character of cereals of the ready-to-eat type which are normally delivered to the ultimate consumer in a dry state.

The term "vitamin" as employed in the specification and appended claims is to be broadly construed to include not only the vitamins per se, but also vitamin-containing or vitamin-producing substances such as the provitamins, vitamin concentrates, and the like.

While we have illustrated the invention by selecting irradiated ergosterol as an example of a fat-soluble vitamin, it is apparent that cod and other fish liver oils, whale liver oil, carotene concentrates and equivalent sources of vitamins A and/or D may be substituted, where desired, for the irradiated ergosterol mentioned in the preferred embodiment. In addition corn oil may be the carrier of the ergosterol instead of sesame oil. It is likewise apparent that wheat germ oil or its equivalent may be employed as the fat-soluble vitamin in case it is desired to fortify the foodstuffs with vitamin E. The fat-soluble vitamins may be employed either singly or in combination, as desired. If desired normally stable water-soluble vitamins may be added to the various vitaminizing fluids hereinbefore described. It is further apparent that the proportions of the various components used in preparing the vitaminizing fluid in the specific example may be varied within wide limits, depending upon the concentration of the various vitamins desired in the ultimate fluid. Many other variations will also be apparent to those skilled in the art. We therefore intend to be restricted only in accordance with the following patent claims.

We claim:

1. A stabilized oil-in-water type emulsified vitaminizing fluid suitable for the fortification of foodstuffs, comprising a fat-soluble vitamin dispersed in an aqueous vehicle, said fluid containing a water-soluble, non-heat-coagulable proteinaceous material consisting of an alcoholic fermentation residue in an amount sufficient to stabilize the emulsion against "breaking."

2. A stabilized vitaminizing fluid suitable for the fortification of foodstuffs, comprising an aqueous solution of thiamin chloride containing a stabilizing buffer in an amount sufficient to maintain the hydrogen ion concentration below a pH of 7, said stabilizing buffer consisting of an alcoholic fermentation residue.

3. The vitaminizing fluid of claim 2 wherein said residue comprises a butylic fermentation residue.

4. A stabilized oil-in-water emulsified vitamin-containing fluid which comprises a fat-soluble vitamin dispersed in an aqueous vehicle, a normally labile water-soluble vitamin dissolved in said vehicle, and an emulsion-stabilizing-and-buffering agent comprising an alcoholic fermentation residue present in an amount sufficient to maintain the hydrogen ion concentration of the resulting emulsion at a pH below 7.

5. The fluid of claim 4 wherein said residue comprises a butylic fermentation residue.

6. The fluid of claim 4 wherein said normally labile water-soluble vitamin comprises thiamin chloride.

FREDUS N. PETERS.
ELDOR G. RUPP.